Nov. 17, 1964   J. A. MARINO ETAL   3,157,870
METHOD AND MEANS OF VOLTAGE TESTING
Filed May 9, 1961   2 Sheets-Sheet 1

INVENTOR
JOSEPH A. MARINO
JOHN H. St.JOHN
BY *John Gibson Semmes*
ATTORNEY

INVENTORS
JOSEPH A. MARINO &
JOHN H. ST JOHN

BY Semmes & Semmes

ATTORNEYS

United States Patent Office 3,157,870
Patented Nov. 17, 1964

3,157,870
METHOD AND MEANS OF VOLTAGE TESTING
Joseph A. Marino, Clark, and John H. St. John, Bogota, N.J., assignors to Marquette Corporation, Minneapolis, Minn., a corporation of Delaware
Filed May 9, 1961, Ser. No. 110,304
10 Claims. (Cl. 340—249)

The present invention relates to method and means for voltage testing. More especially, the concept includes testing automotive storage batteries.

In this invention, means are provided for visually indicating whether a given voltage is precisely at a preset value or above or below same. Through the use of a simple circuit one may now accurately measure direct current voltage by means which are packaged in miniature testing units, no larger than a conventional package of cigarettes.

There has long been a need in battery merchandising for such a device as makes it feasible for the service station operator to check each vehicle battery on the station "island," during the time the vehicle is being serviced with gas, oil and battery water. To date, the devices developed for battery testing have become cumbersome and expensive, in order to provide the necessary accuracy required to determine storage battery condition. Ideal characteristics of a service station voltage testing device are, however: high accuracy; small in size, preferably convenient for pocket carrying; ruggedness; high reliability and low cost. The system described in this invention meets all these reqirements. It has an accuracy of better than one-half of one percent at the pre-set voltage. The circuit preferably comprises entirely solid state switching devices and simple electronic components which give it high ruggedness and reliability. The overall device is the size of a standard cigarette pack and its cost is approximately half that of the most common meter testing device used today.

It is anticipated that because of the simplicity and speed of the testing method hereunder, it will be done by service station attendants on the service island and will, therefore, now make it possible to pick out many batteries which require service. Otherwise such batteries leave the service station, unattended. It is axiomatic in the battery industry that if ten batteries are tested, one will be sold and three will be recharged. The purpose of this tester is to weed out the six good ones and enable the attendant to center his attention on the other four which require attention.

With this invention, it is proposed that acurracy to include at least one-half of one percent be obtained, the same being four times as accurate as conventional meter measuring systems which are currently used as battery and circuit testers.

One objective of invention is to create a novel simple circuit in which visual means are provided to indicate a predetermined voltage, to a high degree of accuracy. In furtherance of this objective is the provision of simplified circuitry to indicate a pre-set voltage value by means of operator manipulation.

A further objective of invention is to create a simple inexpensive and rugged testing system which has the capability of obtaining and creating a signal upon sensing the minute differential between "go" and "no-go" voltage.

These and other objectives will become apparent from reference to the ensuing description.

In the drawings:
FIG. 1 is a diagrammatic view of preferred circuitry employed in the invention;

Figure 1:
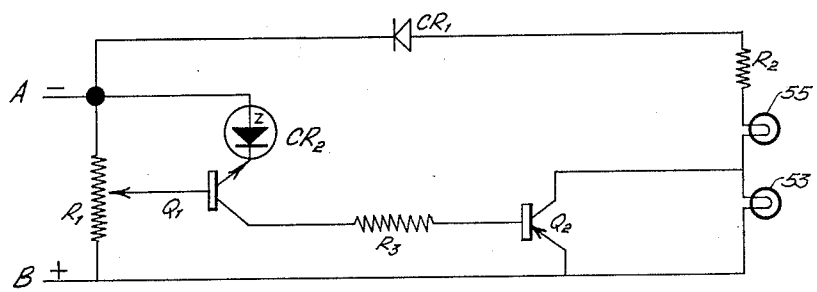

Referring to FIG. 1, terminals A and B are connected to the circuit under test in the proper polarity, the amount of resistance $R_1$ in the diode $CR_2$ circuit having been preset for the voltage under test. Bulbs indicated as 53 and 55 are respectively commercially available type 53 and type 55 bulbs. The Zener diode represented by $CR_2$ will, at the given voltage, break down, thereby causing the transistor $Q_1$ to conduct and through resistance $R_3$ to apply base current to transistor $Q_2$. This is known as "abrupt transition." The transistor $Q_2$ will thereupon conduct, saturate, permitting collector current to flow through resistance $R_2$, the type 55 bulb, bypassing the indicator bulb 53, assuming that the input voltage is sufficient to cause the diode $CR_2$ to break down. If, however, the input voltage is low and insufficient to cause $CR_2$ to conduct or break down, no base current may be applied to the trantsistor $Q_2$. The $Q_2$ transistor being unsaturated, current will flow through both the indicator bulbs 53 and 55 and by virtue of a higher resistance being in the indicator bulb 53 than in bulb 55 the type 53 bulb will become energized and substantially most of the voltage under test will be dropped across it, an insufficient voltage now being dropped across the type 55 indicating bulb to energize it. The function of the rectifier $CR_1$ is to prevent lighting of the indicating bulb 55 should voltage be applied to the input in reverse polarity.

*Operation*

One procedure for testing on the service station island with the device described in this invention is to request the motorist to turn his lights on during the time the car is being filled with gas and the oil is being checked. These activities provide a time interval of from one to two minutes, and just before the hood of the car is closed the attendant can quickly prod the battery with the tester and determine whether or not the battery needs further service. This has been described as a "three second battery tester," and this is literally the time required to undertake the actual testing.

For a conventional automotive battery testing system, the voltage indication is made with an accuracy of ±0.05 volt when testing a 12 volt battery, thus providing the degree of accuracy required for battery diagnosis.

Figure 2:
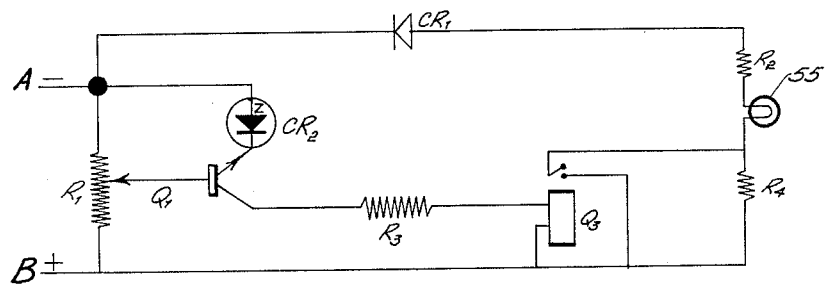
FIG. 2 is a diagrammatic view of circuitry in modification of invention.
Figure 3:
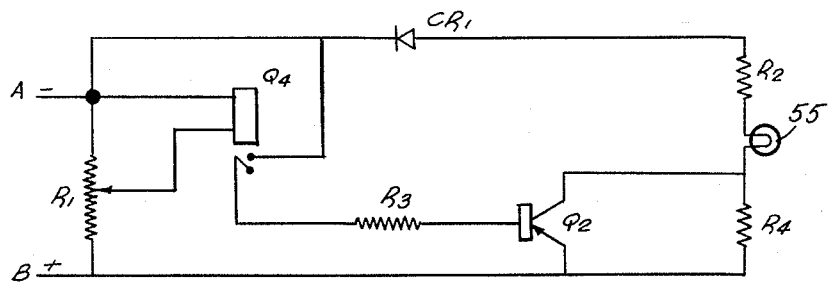
FIG. 3 is a diagrammatic view of circuitry using a relay in place of the Zener diode.
Figure 4:
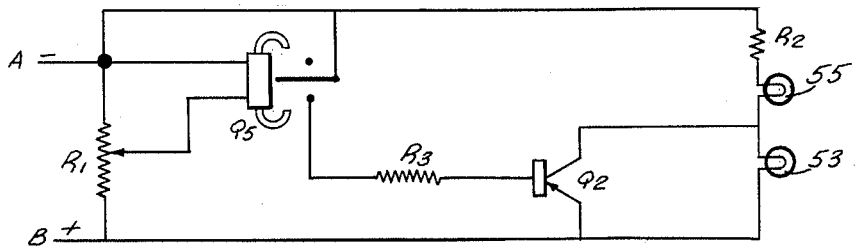
FIG. 4 is a diagrammatic view of circuitry using a polarized relay in place of the Zener diode, obviating the need for rectifier $CR_1$.

To those skilled in the art it will be apparent that the diode $CR_2$ if placed in the base of transistor $Q_1$ would serve substantially the same function. The function of $CR_2$ might also be obtained, there less accurately, through the use of a conventional electro-mechanical relay $Q_4$. Moreover, a polarized $Q_5$ relay would serve a similar purpose if substituted for the diode $CR_2$, whereupon the rectifier might be removed from the circuit. Additionally, the transistor $Q_1$ may be eliminated altogether and the diode $CR_2$ interconnected to the base of transistor $Q_2$. Nevertheless, it will be apparent that the precise voltage indication which is so important to the accurate measurement herein would become greater than when the $Q_1$ transistor is a component of the overall circuit. A similar function could be served should the transistor $Q_2$ be removed entirely from the circuit and a relay substituted therefor, to operate the respective indicator lights. In this instance, the indicator lights are connected to the respective poles of the relay in the same manner that resistance $R_4$ and bulb 55 are connected to the relay in FIGURE 2. Obviously, different coloring to the respective indicator lights will be desirable.

Whereas the method includes the steps of first sensing the voltage under test, interconnecting a voltage sensitive obstacle to the flow of current, amplifying the current change and translating the amplified current

We claim:
1. A system for sensing D.C. voltage in a power source comprising:
   (A) first and second terminals for connection to a source under test;
   (B) first and second resistances connected in series to said terminals, at least one of said first and second resistances comprising an indicating device;
   (C) a third resistance interconnecting said terminals;
   (D) a first switching device interconnecting said first terminal and a point on said third resistance;
   (E) a second switching device having an energizing circuit selectively interconnecting said first and second terminals and having an interrupting circuit selectively interconnecting a point between said first and second resistances and said second terminal; said first switching device completing said energizing circuit upon occurrence of a given potential across said first device; said energizing circuit operating said second switching device, thereby completing said interrupting circuit and shunting said second resistance.

2. The system of claim 1, additionally comprising a rectifier interconnected in series between said first terminal and said first resistance, and wherein said second resistance comprises an indicating device, whereby activating of said second resistance indicating device indicates that D.C. voltage in said power source is below a given value.

3. The system of claim 1, wherein said first switching device comprises a relay having an operating circuit connected to said first terminal and a point on said third resistance.

4. A system for sensing D.C. voltage in a power source comprising:
   (A) first and second terminals for connection to a source under test;
   (B) first and second resistances connected in series to said terminals, at least one of said first and second resistances being an indicating device;
   (C) a third resistance interconnecting said terminals;
   (D) a first transistor, having a base, emitter and collector;
   (E) a Zener diode operatively interconnecting said first terminal and one of said emitter and collector of said first transistor;
   (F) a selector interconnecting a point on said third resistance with the base of said first transistor;
   (G) a switching device having an energizing circuit and an interrupting circuit, said energizing circuit interconnecting the other of said emitter and collector of said first transistor and said second terminal and being operative to complete said interrupting circuit, said interrupting circuit being connected to a point intermediate said first and second resistances and to said second terminal, thereby shunting said second resistance when said interrupting circuit is completed.

5. The system of claim 4, wherein each of said first and second resistances comprises an indicating device.

6. The system of claim 4, wherein said first and second resistances comprise indicating bulbs.

7. The system of claim 4, wherein at least one of said first resistances and second resistances comprises an indicating bulb and a fourth resistance.

8. The system of claim 4, wherein said switching device comprises a second transistor, asid energizing circuit comprises a base and one of an emitter and collector of said second transistor, and said interrupted circuit comprises an emitter and collector of said transistor.

9. The system of claim 4, wherein said switching device comprises a relay.

10. The system of claim 4, additionally comprising a diode interconnected between said first terminal and said first resistance.

References Cited by the Examiner
UNITED STATES PATENTS

| | | |
|---|---|---|
| 2,751,550 | 6/56 | Chase. |
| 2,896,151 | 7/59 | Zelinka. |
| 2,900,530 | 8/59 | Rowland. |
| 2,942,123 | 6/60 | Schuh. |
| 2,942,189 | 6/60 | Shea _____ 324—133 |
| 2,947,916 | 8/60 | Beck _____ 317—148.5 |
| 2,980,897 | 4/61 | Meszaros _____ 340—248 |
| 2,991,413 | 7/61 | Taylor _____ 340—249 |
| 2,993,172 | 7/61 | Karlicek _____ 324—133 |
| 3,014,159 | 12/61 | Frank. |
| 3,015,477 | 1/62 | Persson et al. _____ 340—248 XR |
| 3,018,432 | 1/62 | Palmer _____ 340—249 |
| 3,076,901 | 2/63 | Rubin et al. _____ 324—133 XR |
| 3,099,827 | 7/63 | Wu _____ 340—248 |

FOREIGN PATENTS

| | | |
|---|---|---|
| 517,000 | 1/40 | Great Britain. |

NEIL C. READ, *Primary Examiner.*

BENNETT G. MILLER, *Examiner.*